United States Patent
Yi et al.

(10) Patent No.: US 10,470,210 B2
(45) Date of Patent: Nov. 5, 2019

(54) METHOD FOR PERFORMING RLC RETRANSMISSION BASED ON CONTENTION-BASED PUSCH IN A WIRELESS COMMUNICATION SYSTEM AND A DEVICE THEREFOR

(71) Applicant: LG ELECTRONICS INC., Seoul (KR)

(72) Inventors: Seungjune Yi, Seoul (KR); Sunyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 33 days.

(21) Appl. No.: 15/570,309

(22) PCT Filed: Apr. 20, 2016

(86) PCT No.: PCT/KR2016/004120
§ 371 (c)(1),
(2) Date: Oct. 27, 2017

(87) PCT Pub. No.: WO2016/182220
PCT Pub. Date: Nov. 17, 2016

(65) Prior Publication Data
US 2018/0132279 A1    May 10, 2018

Related U.S. Application Data

(60) Provisional application No. 62/159,934, filed on May 11, 2015.

(51) Int. Cl.
*H04W 74/08*   (2009.01)
*H04L 1/18*    (2006.01)
(Continued)

(52) U.S. Cl.
CPC .......... *H04W 74/08* (2013.01); *H04L 1/1861* (2013.01); *H04W 28/0294* (2013.01);
(Continued)

(58) Field of Classification Search
CPC ....... H04L 1/1861; H04L 1/18; H04L 1/1812; H04L 5/0053; H04L 5/0091; H04W 72/04;
(Continued)

(56) References Cited

U.S. PATENT DOCUMENTS 8,306,061 B2 * 11/2012 Lee ........................ H04L 1/1887
370/328
2003/0093739 A1 * 5/2003 Han ........................ H03M 13/00
714/746
(Continued)

OTHER PUBLICATIONS

PCT International Application No. PCT/KR2016/004120, Notification of Transmittal of the International Search Report and the Written Opinion of the International Searching Authority, or Declaration dated Aug. 10, 2016, 10 pages.

*Primary Examiner* — Dung B Huynh
(74) *Attorney, Agent, or Firm* — Lee Hong Degerman Kang & Waimey

(57) ABSTRACT

The present invention relates to a wireless communication system. More specifically, the present invention relates to a method and a device for performing RLC retransmission based on contention-based PUSCH in a wireless communication system, the method comprising: transmitting a MAC PDU including at least one RLC PDU received from a RLC entity and an identifier of the UE using a CB grant to an eNB; determining whether the MAC PDU transmission using the CB grant is failed or not; indicating result of the determining for the MAC PDU transmission using the CB grant; receiving the at least one RLC PDU at a next transmission opportunity if the MAC PDU transmission
(Continued)

using the CB grant is failed, without considering that RLC status report including NACK for the at least one RLC PDU is not received.

8 Claims, 12 Drawing Sheets

(51) Int. Cl.
*H04W 72/04* (2009.01)
*H04W 28/02* (2009.01)
*H04W 74/00* (2009.01)
*H04L 5/00* (2006.01)

(52) U.S. Cl.
CPC ........... *H04W 72/04* (2013.01); *H04L 1/1812* (2013.01); *H04L 5/0053* (2013.01); *H04L 5/0091* (2013.01); *H04W 74/004* (2013.01)

(58) Field of Classification Search
CPC .. H04W 74/04; H04W 74/08; H04W 28/0294
See application file for complete search history.

(56) References Cited

U.S. PATENT DOCUMENTS

| | | | | |
|---|---|---|---|---|
| 2003/0103459 A1* | 6/2003 | Connors | ............... | H04L 1/1614 370/235 |
| 2004/0184437 A1* | 9/2004 | Lee | ............... | H04L 1/1685 370/349 |
| 2005/0135284 A1* | 6/2005 | Nanda | ............... | H04L 29/06068 370/294 |
| 2007/0025388 A1* | 2/2007 | Abhishek | ............... | H04L 1/188 370/447 |
| 2007/0283032 A1* | 12/2007 | Kim | ............... | H04L 1/1685 709/230 |
| 2007/0291688 A1* | 12/2007 | Jiang | ............... | H04L 1/1812 370/328 |
| 2008/0010578 A1* | 1/2008 | Jiang | ............... | H04L 1/1848 714/748 |
| 2008/0022180 A1* | 1/2008 | Kuo | ............... | H04L 1/188 714/748 |
| 2008/0056148 A1* | 3/2008 | Wu | ............... | H04L 1/1829 370/252 |
| 2008/0279171 A1* | 11/2008 | Kim | ............... | H04L 1/1685 370/346 |
| 2009/0109951 A1* | 4/2009 | Tseng | ............... | H04L 1/1816 370/345 |
| 2009/0185528 A1* | 7/2009 | Sambhwani | ............... | H04L 1/1835 370/329 |
| 2009/0190480 A1* | 7/2009 | Sammour | ............... | H04L 1/1848 370/242 |
| 2009/0190526 A1* | 7/2009 | Pani | ............... | H04L 47/36 370/328 |
| 2009/0319850 A1* | 12/2009 | Baek | ............... | H04L 1/1874 714/748 |
| 2009/0323634 A1* | 12/2009 | Kim | ............... | H04W 52/287 370/331 |
| 2009/0323671 A1* | 12/2009 | Wu | ............... | H04W 28/065 370/352 |
| 2010/0074222 A1* | 3/2010 | Wu | ............... | H04L 1/1874 370/331 |
| 2010/0105405 A1* | 4/2010 | Vujcic | ............... | H04J 13/22 455/452.1 |
| 2010/0111029 A1* | 5/2010 | Chou | ............... | H04J 3/0682 370/329 |
| 2010/0220643 A1* | 9/2010 | Qi | ............... | H04W 72/005 370/312 |
| 2010/0257423 A1* | 10/2010 | Kim | ............... | H04L 1/16 714/749 |
| 2010/0278051 A1* | 11/2010 | Larmo | ............... | H04L 1/1848 370/242 |
| 2010/0296431 A1* | 11/2010 | Terry | ............... | H04L 1/1812 370/315 |
| 2010/0304733 A1* | 12/2010 | Yi | ............... | H04L 1/1874 455/422.1 |
| 2011/0013567 A1* | 1/2011 | Torsner | ............... | H04L 1/1621 370/328 |
| 2011/0041024 A1* | 2/2011 | Burbidge | ............... | H04L 1/1621 714/749 |
| 2011/0051664 A1* | 3/2011 | Kim | ............... | H04L 1/1851 370/328 |
| 2011/0292895 A1* | 12/2011 | Wager | ............... | H04L 5/0007 370/329 |
| 2012/0163322 A1* | 6/2012 | Larmo | ............... | H04L 1/1854 370/329 |
| 2012/0275381 A1* | 11/2012 | Kim | ............... | H04W 74/08 370/328 |
| 2012/0300744 A1* | 11/2012 | Larmo | ............... | H04W 72/1284 370/329 |
| 2012/0314672 A1* | 12/2012 | Chen | ............... | H04W 74/002 370/329 |
| 2012/0320760 A1 | 12/2012 | Kim et al. | | |
| 2013/0016689 A1* | 1/2013 | Jeong | ............... | H04W 74/02 370/329 |
| 2013/0021982 A1* | 1/2013 | Kim | ............... | H04L 1/1887 370/328 |
| 2013/0022012 A1* | 1/2013 | Lee | ............... | H04W 52/0216 370/329 |
| 2013/0034071 A1* | 2/2013 | Lee | ............... | H04W 74/0866 370/329 |
| 2013/0083737 A1* | 4/2013 | Earnshaw | ............... | H04L 1/1887 370/329 |
| 2013/0114494 A1* | 5/2013 | Yuk | ............... | H04W 72/04 370/312 |
| 2013/0176954 A1* | 7/2013 | Lv | ............... | H04W 74/04 370/329 |
| 2013/0279465 A1 | 10/2013 | Timner et al. | | |
| 2013/0301541 A1* | 11/2013 | Mukherjee | ............... | H04W 74/0833 370/329 |
| 2014/0177534 A1* | 6/2014 | McHardy | ............... | H04W 72/04 370/329 |
| 2015/0327315 A1* | 11/2015 | Xue | ............... | H04L 5/0044 370/330 |
| 2015/0372922 A1* | 12/2015 | He | ............... | H04L 45/16 370/235 |
| 2016/0073428 A1* | 3/2016 | Vutukuri | ............... | H04W 72/1215 370/329 |
| 2018/0083738 A1* | 3/2018 | Yi | ............... | H04L 1/1887 |

* cited by examiner

FIG. 3
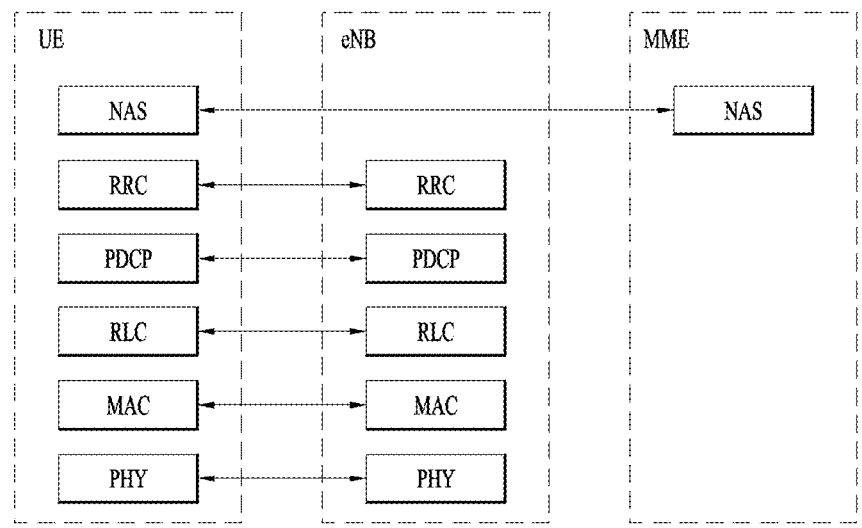
( a ) Control-Plane Protocol Stack
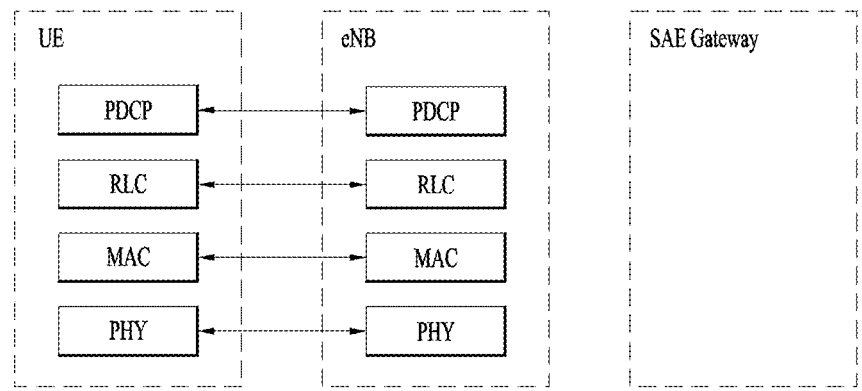
( b ) User-Plane Protocol Stack

METHOD FOR PERFORMING RLC RETRANSMISSION BASED ON CONTENTION-BASED PUSCH IN A WIRELESS COMMUNICATION SYSTEM AND A DEVICE THEREFOR

CROSS-REFERENCE TO RELATED APPLICATIONS

This application is the National Stage filing under 35 U.S.C. 371 of International Application No. PCT/KR2016/004120, filed on Apr. 20, 2016, which claims the benefit of U.S. Provisional Application No. 62/159,934, filed on May 11, 2015, the contents of which are all hereby incorporated by reference herein in its entirety.

TECHNICAL FIELD

The present invention relates to a wireless communication system and, more particularly, to a method for performing RLC retransmission based on contention-based PUSCH in a wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for performing RLC retransmission based on contention-based PUSCH in a wireless communication system. The technical problems solved by the present invention are not limited to the above technical problems and those skilled in the art may understand other technical problems from the following description.

Technical Solution

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects

It is invented that the transmitting RLC entity performs retransmission of an RLC PDU when the UE decides that the MAC PDU containing the RLC PDU transmission on the contention-based grant is failed.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 3 is a diagram showing a control plane and a user plane of a radio interface protocol between a UE and an E-UTRAN based on a 3rd generation partnership project (3GPP) radio access network standard;

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
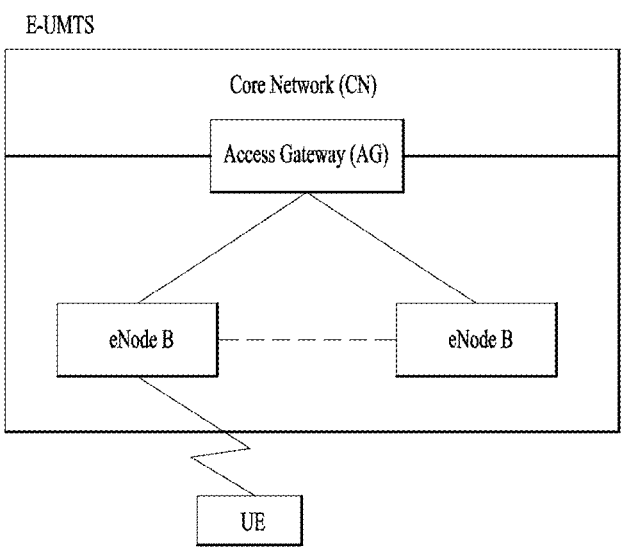
FIG. 1 is a diagram showing a network structure of an Evolved Universal Mobile Telecommunications System (E-UMTS) as an example of a wireless communication system.
Figure 2A:
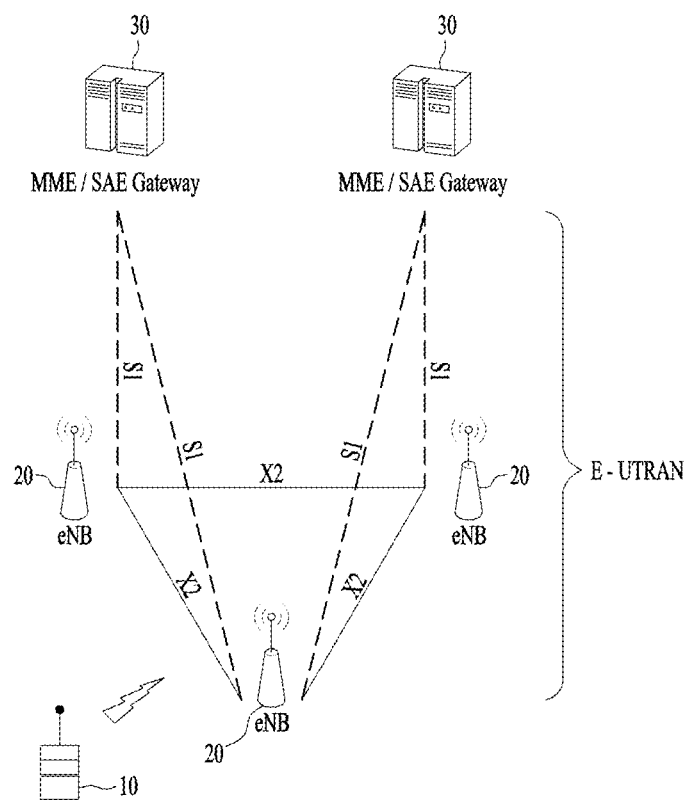
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
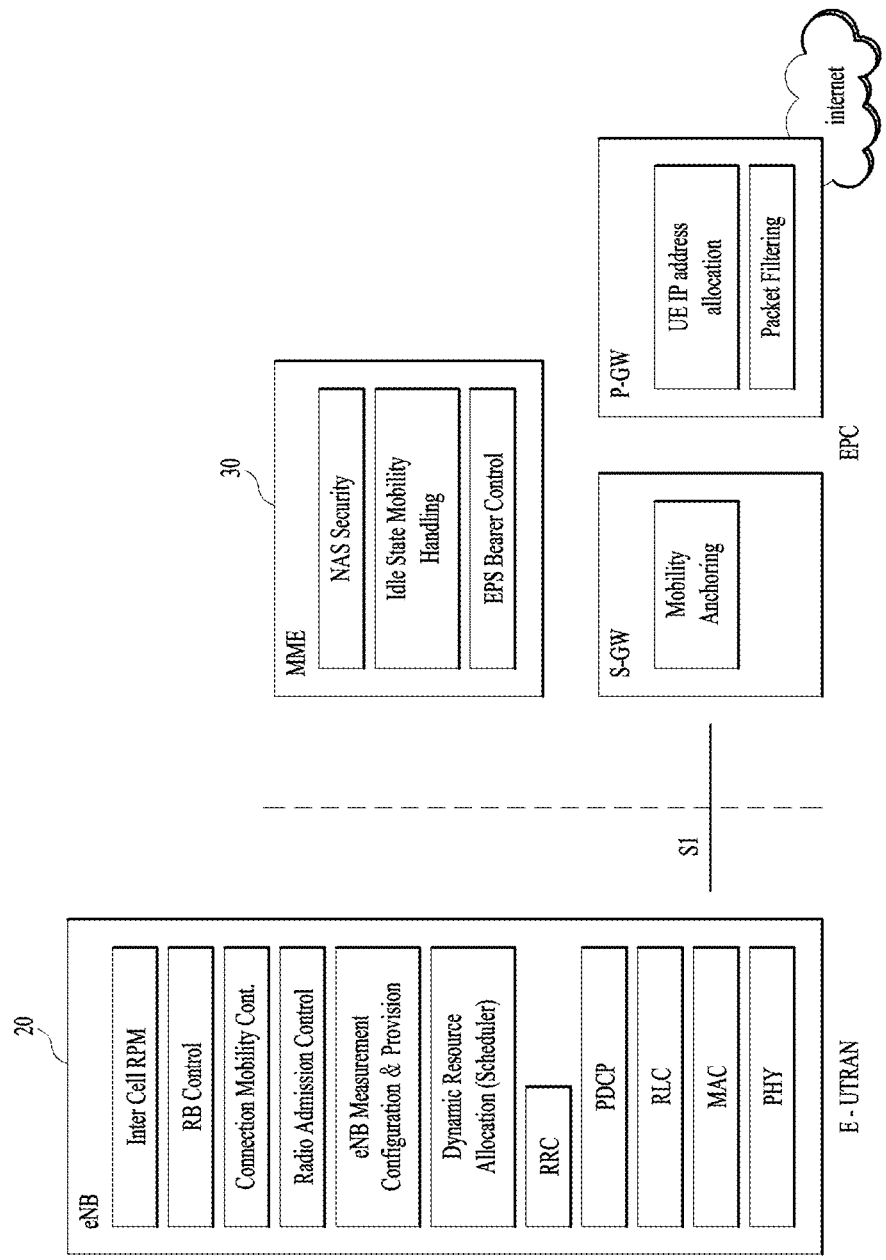
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
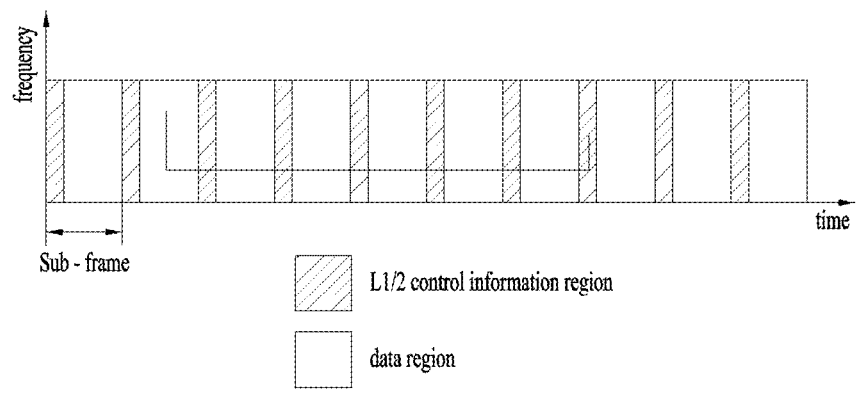
FIG. 4 is a view showing an example of a physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
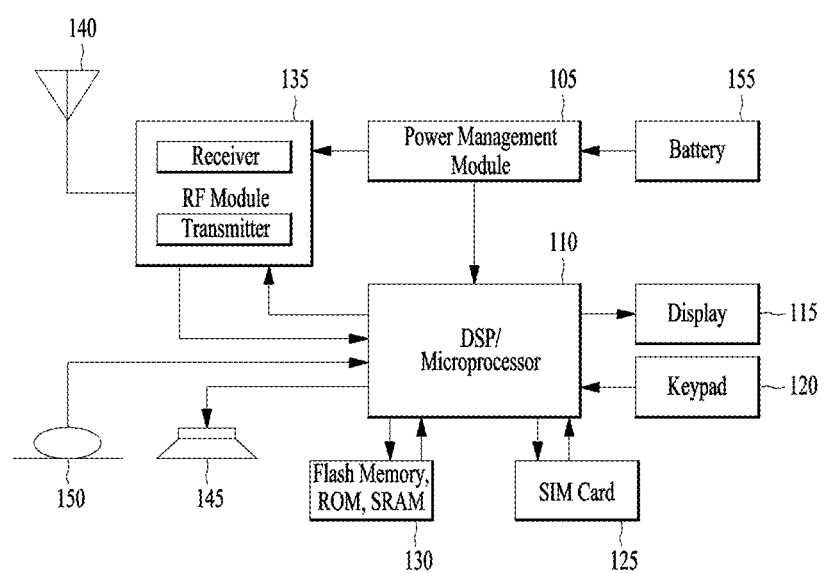
FIG. 5 is a block diagram of a communication apparatus according to an embodiment of the present invention.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transmiceiver;

135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Figure 6:
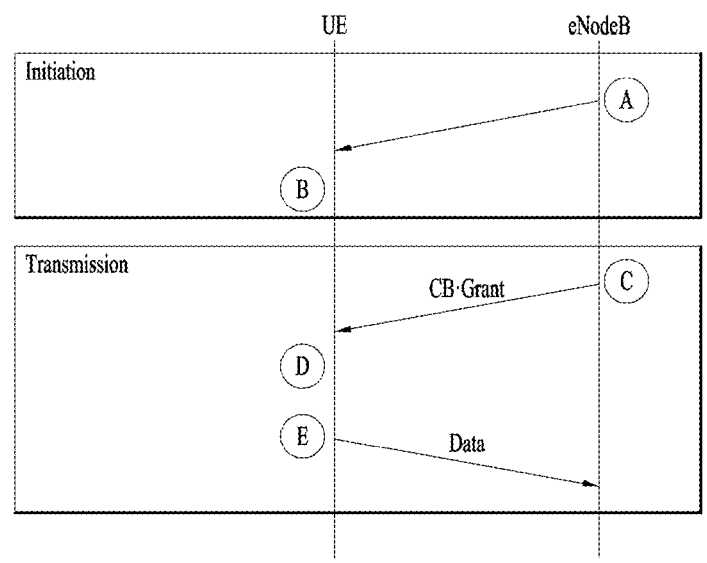
FIG. 6 is an example for a diagram for performing contention based transmission.

FIG. 6 is an example for a diagram for performing contention based transmission.

One simple but efficient method for latency reduction for typical internet traffic in an unloaded or partially-loaded network is Pre-allocation. Pre-allocation is a form of pre-scheduling that provides the UE with an opportunity to send UL packets without requiring the UE to send a scheduling request. The scheduling request procedure when in-sync takes 10 ms, and this makes it impossible for LTE to support the original RAN latency requirement of 10 ms round trip (2×5 ms one way) delay defined in the original LTE requirement specification 25.913 unless UL resources are pre-scheduled for the terminal.

Pre-allocation provides resource block grants to UEs in case they have something to transmit when those resource blocks are not used for actual traffic from other UEs. One possibility for the network is to trigger such pre-allocation of UL resources using downlink packets that are likely to require some acknowledgement from the UE (e.g. a Ping or TCP ACK). More generalized schemes can also be considered.

Note that Pre-allocation is different from other forms of pre-scheduling such as Semi-persistent scheduling. Pre-allocation uses the PDCCH to grant UL resources when not used by actual traffic. On the other hand semi-persistent scheduling provides a regular allocation to the UE without repetitive scheduling on the PDCCH.

Meanwhile, the goal with Contention Based (CB) transmission is to allow uplink synchronized UEs to transmit uplink data without sending Scheduling Request in advance. That would reduce both the latency and the signaling overhead. For small data packets, there could be a tradeoff point where a small packet is more efficiently transmitted on a CB channel, compared to a scheduled one.

A general property of CB channels is that the error rate increases, since data packets may collide with each other. Collisions reduce the maximum throughput of the channel and the throughput becomes sensitive to the offered load. If the offered load is allowed to increase beyond the channel capacity, the collision probability increases rapidly, the system becomes unstable and the throughput decreases. It is therefore of prime importance that CB transmissions do not interfere with Contention Free (CF) uplink transmissions, and that the eNB has effective and fast means of allocating the resources for CB transmission.

One way to achieve the above is to allow CB transmission only in uplink Resource Blocks that have not been reserved for CF uplink transmission. Dynamic assignment of uplink Resource Blocks for CB transmission can be achieved by using the Downlink Physical Control CHannel (PDCCH). By using the PDCCH, CB grants can be assigned to unused resources on a per subframe basis, so that scheduling of uplink CF transmissions is not affected. In this way, a static assignment of CB resources can be avoided, and CB resources can be dynamically assigned, depending on the uplink load.

Contention Based Radio Network Temporary Identifiers (CB-RNTI) are introduced to identify the CB uplink grants on the PDCCH. The CB uplink grants could have the same format as for Rel-8 UEs, i.e. specify Resource Blocks, Modulation and Coding Scheme and Transport Format to be used for the uplink CB transmission. Rel-10 UEs may listen for CB uplink grants addressed to these CB-RNTIs in addition to grants addressed to their dedicated C-RNTI. The available CB-RNTIs in a cell could be either broadcasted or signaled to each UE during RRC connection setup. The scheme is backwards compatible, since pre Rel-10 UEs would not decode the grants addressed to CB-RNTIs.

As a common resource is used, a unique UE identifier is needed in the MAC PDU to identify the UE. The C-RNTI MAC Control Element can be added to each MAC PDU transmitted using a CB uplink resource.

A UE should only be allowed to transmit on CB uplink grants if it does not have a dedicated CF grant. The UE should only be allowed to use CB resources for a limited number of subframes, to improve collision resolution. In parallel to the CB transmission, the UE can also transmit a Scheduling Request to request contention free resources. Note however that in order to maintain the single carrier uplink property, these cannot be transmitted in the same subframe.

The contention based transmission scheme could be as shown in FIG. 6.

Regarding FIG. 6, the eNodeB informs UE of available CB-RNTIs either by broadcast or dedicated signaling (A). The UE receives the CB-RNTIs and starts monitoring PDCCH for available CB grant (B). The eNodeB schedules a CB grant on the PDCCH (C), and the UE detects a CB grant and performs L2 & L1 processing of the data to be transmitted (D). The UE transmits the data on PUSCH using the CB grant (E).

In the proposed form, the CB transmission is supported only for synchronized UEs. In this form, changes to the current specifications are expected to be small and would mainly affect the MAC and RRC specifications. As presented in section 3, there is a perceivable gain in e.g. TCP performance.

Extending the concept to also cover unsynchronized UEs would require substantial changes to the physical layer specifications. For unsynchronized UEs, the transmissions would not fit within the subframe borders, and there would be a need for guard times to avoid overlapping transmissions. Also some form of preamble would be needed to synchronize the eNB receiver. The gain of extending CB transmission scheme to unsynchronized UEs is expected to be small. The gain for synchronized UEs comes from repetitions of the 6 ms difference. For unsynchronized UEs, this would come only once per transaction, as after this the UE would be synchronized. Therefore, we do not consider CB transmissions from unsynchronized UEs to be a worthwhile solution.

Figure 7:
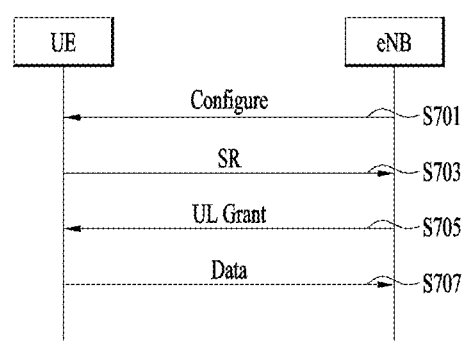
FIG. 7 is an example for a diagram for performing contention based SR procedure.

FIG. 7 is an example for a diagram for performing contention based SR procedure.

In Rel-8, the SR resource and sequence is allocated to a UE via RRC signaling. Of course shorter SR periodicities come at the cost of higher PUCCH resource consumption. The theoretical SR capacity is 18 UEs per PRB, if 180 UEs are supported, the number of PRB equals 180/18=10. If 10 MHz bandwidth is assumed with 1 ms SR period, 20% resource will be used for SR, which is a heavy control channel burden. Hence we propose to consider sharing the SR resource among more than one UE.

FIG. 7 illustrates how SR could be shared. The eNB configures the same SR resource for several UEs through RRC signaling (S701). The UE(s) sends SR to the eNB using the configured SR resource (S703). If there is no collision SR, the eNB allocates a PUSCH grant (S705). The UE transmits the uplink data on the PUSCH (S707).

Two options can be considered to enable sharing SR.

Option 1 is that the UL Grant is addressed to a new SR-RNTI (Shared SR RNTI), configured per group of sharing UEs. Option 2 is that PUCCH Format 1a and/or Format 1b is used for SR. For example, when Format 1a is used, 2 UEs can be identified; with for Format 1b, 4UEs can be identified. After the eNB receives the SR using format 1a and/or 1b, it can allocate a regular UL grant to the identified UE.

We now discuss the handling when more than one UE uses the same PUCCH-SR resource in a TTI (collision).

For option 1, the eNB may not be able to tell when a PUCCH-SR collision happens; it grants resources for UL transmission and more than one UE uses it. The PUSCH transmission will fail. The eNB could in this case provide grants to the C-RNTIs of each UE sharing that resource or do nothing. The UE may send SR again if no UL grant is received after sending SR, but needs to apply some (random or UE specific) delay, to avoid continued collision with another UE that would have sent an SR at the same time. The efficiency of such solution depends on the collision probability and degree of robustness of the selected MCS in UL grant: (i.e. if the MCS is quite robust, a first non-colliding transmission is often decoded successfully, so a failed transmission could be assumed caused by a collision).

For option 2, SR collisions likely results in DTX detection at eNB, so no uplink grant is given. The UE behavior can be similar as for option 1. It could be further studied if the eNB can differentiate between receiving a collision or receiving high interference. If the eNB can differentiate, it could allocate UL resource for all the UEs sharing the collided resource separately, which helps to reduce the access delay caused by backoff after collision.

Based on above analysis, it seems option 2 provides simpler and more resource efficient SR collision processing mechanism than option 1. In addition, no new SR-RNTI is needed in option 2.

Both options are inefficient in case PUCCH-SR collision occurs, but again, if SR period is short and few UEs share it, the collision probability remains low.

The sharing PUCCH-SR procedure is compared with CB-PUSCH and we conclude that CB-PUSCH provides best delay performance when the eNB has unused PUSCH resource. When the network is loaded, sharing SR is preferred.

Figure 8:
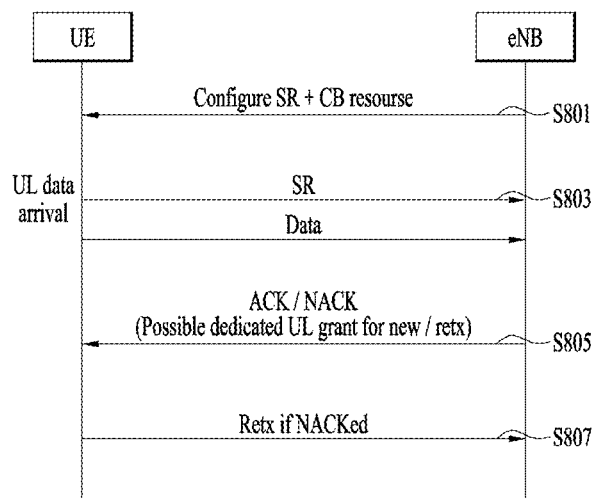
FIG. 8 is an example for a diagram for performing contention based transmission.

FIG. 8 is an example for a diagram for performing contention based transmission.

There might be 3 ms difference between contention based transmission and 1 ms SR period with the assumption of contention based resource is available every TTI, because UE does not need to transmit the dedicated-SR (D-SR) and wait for eNB to response. The same performance could be achieved with dedicated pre-allocation, but it would be very costly to allocate dedicated resources for every UE in every TTI. SR associated contention based transmission offers an interesting compromise, in which the pre-allocated resource is shared and identification of the UEs making use of it is done via the D-SR. The basic procedure of SR associated contention based transmission is shown in FIG. 8.

The eNB configures the UE with D-SR and shared resource (S801). Upon UL data arrival, UE sends SR and the TB on the shared resource "simultaneously" without waiting for dedicated UL grant (S803). The eNB can identify the UEs using the contention based resource based on the received SR. When eNB receives more than one SR linked to same resource, which means collision happens, ACK the TB no matter it is correctly decoded or not and give dedicated grant to each UE sent the SR, i.e. fall back to R8/9; (The ACKed TB would rely on RLC retransmission for collision case). When the eNB only receives one SR linked to the same resource, no collision, NACK if the TB is not correctly decoded, ACK otherwise. Thus from UE perspective, normal R8/9 HARQ is still applicable (S805).

Adaptive retransmission with different resource is possible as UE is identified with the SR which will reduce the load on the contention based resource (S807).

Meanwhile, resource usage efficiency was one of the main concerns raised on contention based transmission on PUSCH because very conservative MCS needs to be used to guarantee the coverage. A contention based resource for a TB of the mostly mentioned typical TCP ACK use case, taking into account RLC header (at least 1~2 bytes)+MAC header with one more byte to be added for UE identity and possible BSR (2~4 bytes), would need 3~4 PRBs (16 bits TBS for one PRB with most conservative MCS); while if dedicated grant with proper MCS (at most 712 bits TBS for one PRB), much less resource is needed to accommodate the TB. If several contention based resources are to be reserved to reduce collision probability, the capacity for dedicated grant would be significantly impacted, which makes the 3 ms latency reduction optimization a rather expensive one.

Furthermore, normal HARQ operation probably cannot work because retransmission from UE upon receiving NACK does not help or even makes the situation worse if the decoding failure is because of collision, and it is difficult (if not impossible) for the eNB to make soft combining of the TB transmitted on the contention based resource; while ACK cannot be interpreted as ACK because it could be an ACK for other UEs. No HARQ makes resource efficiency worse as even more conservative MCS would be required to ensure the TB can be decoded within only one transmission for cell edge UE.

Figure 9:
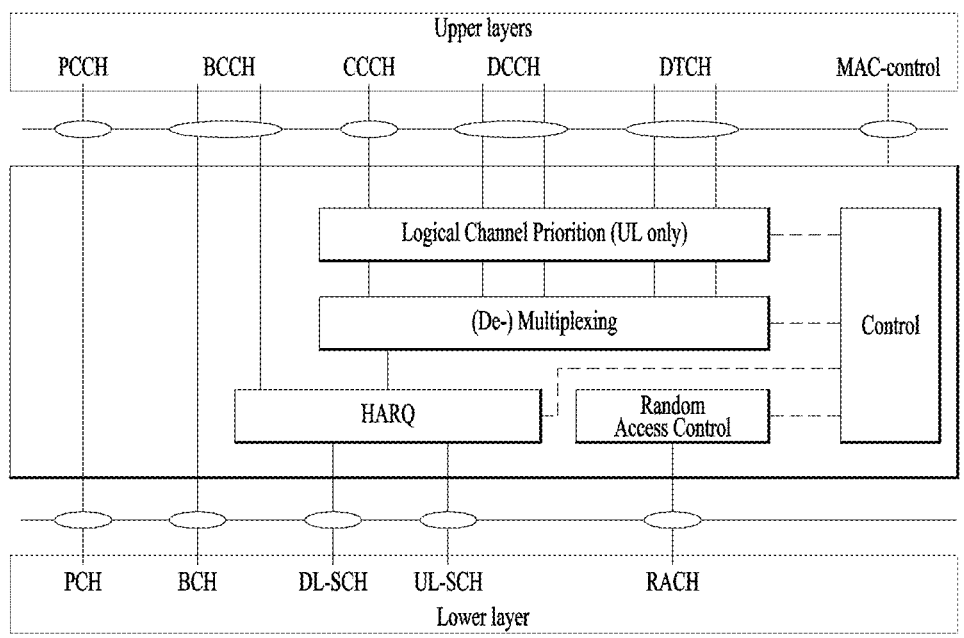
FIG. 9 is a diagram for MAC structure overview in a UE side.

FIG. 9 is a diagram for MAC structure overview in a UE side.

The MAC layer handles logical-channel multiplexing, hybrid-ARQ retransmissions, and uplink and downlink scheduling. It is also responsible for multiplexing/demultiplexing data across multiple component carriers when carrier aggregation is used.

The MAC provides services to the RLC in the form of logical channels. A logical channel is defined by the type of information it carries and is generally classified as a control channel, used for transmission of control and configuration information necessary for operating an LTE system, or as a traffic channel, used for the user data. The set of logical channel types specified for LTE includes Broadcast Control Channel (BCCH), Paging Control Channel (PCCH), Common Control Channel (CCCH), Dedicated Control Channel (DCCH), Multicast Control Channel (MCCH), Dedicated Traffic Channel (DTCH), Multicast Traffic Channel (MTCH).

From the physical layer, the MAC layer uses services in the form of transport channels. A transport channel is defined by how and with what characteristics the information is transmitted over the radio interface. Data on a transport channel is organized into transport blocks. In each Transmission Time Interval (TTI), at most one transport block of dynamic size is transmitted over the radio interface to/from a terminal in the absence of spatial multiplexing. In the case of spatial multiplexing (MIMO), there can be up to two transport blocks per TTI.

Associated with each transport block is a Transport Format (TF), specifying how the transport block is to be transmitted over the radio interface. The transport format includes information about the transport-block size, the modulation-and-coding scheme, and the antenna mapping. By varying the transport format, the MAC layer can thus realize different data rates. Rate control is therefore also known as transport-format selection.

To support priority handling, multiple logical channels, where each logical channel has its own RLC entity, can be multiplexed into one transport channel by the MAC layer. At the receiver, the MAC layer handles the corresponding demultiplexing and forwards the RLC PDUs to their respective RLC entity for in-sequence delivery and the other functions handled by the RLC. To support the demultiplexing at the receiver, a MAC is used. To each RLC PDU, there is an associated sub-header in the MAC header. The sub-header contains the identity of the logical channel (LCID) from which the RLC PDU originated and the length of the PDU in bytes. There is also a flag indicating whether this is the last sub-header or not. One or several RLC PDUs, together with the MAC header and, if necessary, padding to meet the scheduled transport-block size, form one transport block which is forwarded to the physical layer.

In addition to multiplexing of different logical channels, the MAC layer can also insert the so-called MAC control elements into the transport blocks to be transmitted over the transport channels. A MAC control element is used for inband control signaling—for example, timing-advance commands and random-access response. Control elements are identified with reserved values in the LCID field, where the LCID value indicates the type of control information.

Furthermore, the length field in the sub-header is removed for control elements with a fixed length.

The MAC multiplexing functionality is also responsible for handling of multiple component carriers in the case of carrier aggregation. The basic principle for carrier aggregation is independent processing of the component carriers in the physical layer, including control signaling, scheduling and hybrid-ARQ retransmissions, while carrier aggregation is invisible to RLC and PDCP. Carrier aggregation is therefore mainly seen in the MAC layer, where logical channels, including any MAC control elements, are multiplexed to form one (two in the case of spatial multiplexing) transport block(s) per component carrier with each component carrier having its own hybrid-ARQ entity.

Figure 10:
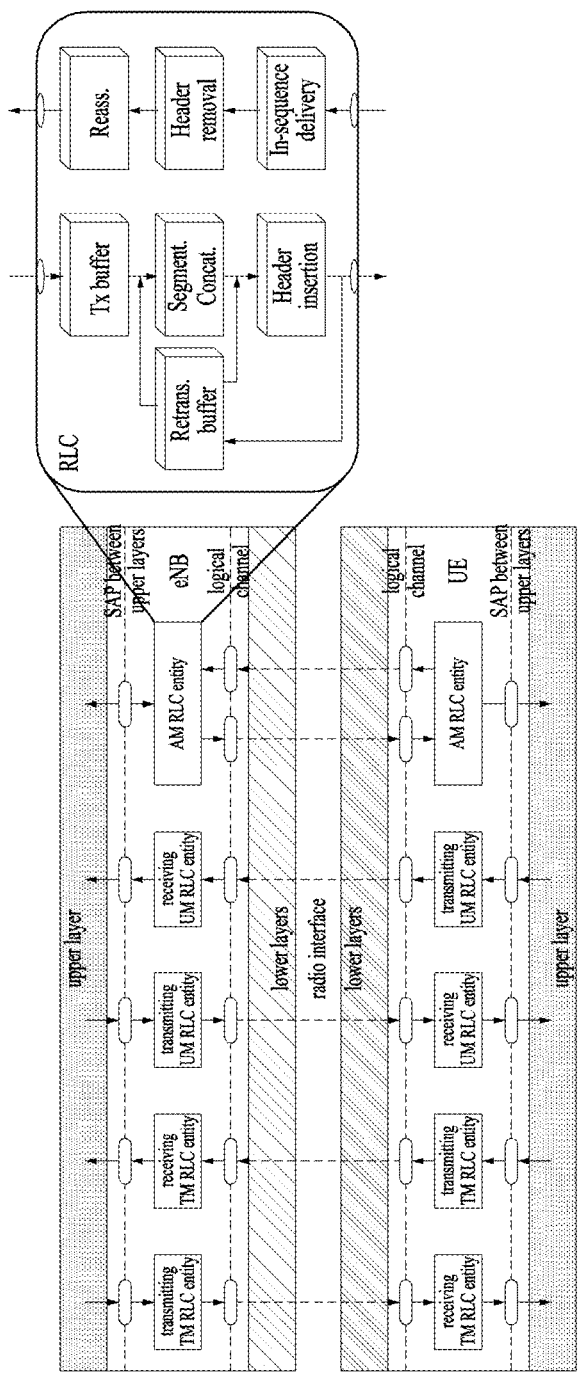
FIG. 10 is a conceptual diagram for an RLC entity architecture.

FIG. 10 is a conceptual diagram for an RLC entity architecture.

The RLC protocol takes data in the form of RLC SDUs from PDCP and delivers them to the corresponding RLC entity in the receiver by using functionality in MAC and physical layers. The relation between RLC and MAC, including multiplexing of multiple logical channels into a single transport channel, is illustrated in FIG. 10. Multiplexing of several logical channels into a single transport channel is mainly used for priority handling in conjunction with downlink and uplink scheduling.

There is one RLC entity per logical channel configured for a terminal, where each RLC entity is responsible for: i) segmentation, concatenation, and reassembly of RLC SDUs; ii) RLC retransmission; and iii) in-sequence delivery and duplicate detection for the corresponding logical channel.

Other noteworthy features of the RLC are: (1) the handling of varying PDU sizes; and (2) the possibility for close interaction between the hybrid-ARQ and RLC protocols. Finally, the fact that there is one RLC entity per logical channel and one hybrid-ARQ entity per component carrier implies that one RLC entity may interact with multiple hybrid-ARQ entities in the case of carrier aggregation.

The purpose of the segmentation and concatenation mechanism is to generate RLC PDUs of appropriate size from the incoming RLC SDUs. One possibility would be to define a fixed PDU size, a size that would result in a compromise. If the size were too large, it would not be possible to support the lowest data rates. Also, excessive padding would be required in some scenarios. A single small PDU size, however, would result in a high overhead from the header included with each PDU. To avoid these drawbacks, which is especially important given the very large dynamic range of data rates supported by LTE, the RLC PDU size varies dynamically.

In process of segmentation and concatenation of RLC SDUs into RLC PDUs, a header includes, among other fields, a sequence number, which is used by the reordering and retransmission mechanisms. The reassembly function at the receiver side performs the reverse operation to reassemble the SDUs from the received PDUs.

Meanwhile, retransmission of missing PDUs is one of the main functionalities of the RLC. Although most of the errors can be handled by the hybrid-ARQ protocol, there are benefits of having a second-level retransmission mechanism as a complement. By inspecting the sequence numbers of the received PDUs, missing PDUs can be detected and a retransmission requested from the transmitting side.

Different services have different requirements; for some services (for example, transfer of a large file), error-free delivery of data is important, whereas for other applications (for example, streaming services), a small amount of missing packets is not a problem. The RLC can therefore operate in three different modes, depending on the requirements from the application.

Figure 11:
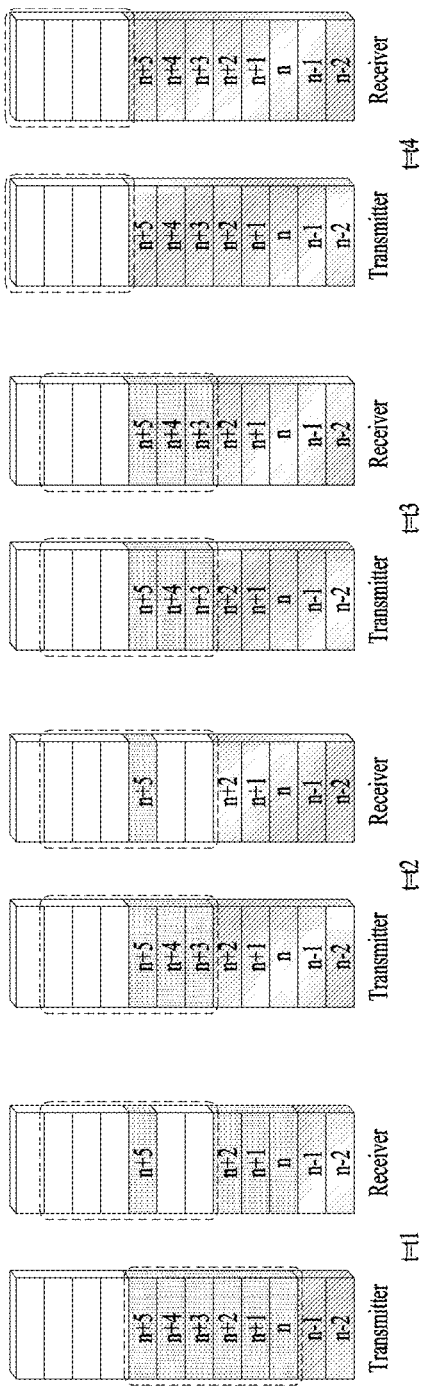
FIG. 11 is a conceptual diagram for performing re-transmission in an RLC entity.

FIG. 11 is a conceptual diagram for performing re-transmission in an RLC entity.

The RLC entity is responsible for regimentation of IP packets, also known as RLC SDUs, form the PDCP into smaller units, RLC PDUs. It also handles retransmission of erroneously received PDUs, as well as duplicate removal and concatenation of received PDUs. Finally, RLC ensures in-sequence delivery of RLC SDUs to upper layers.

The RLC retransmission mechanism is responsible for providing error-free delivery of data to higher layers. To accomplish this, a retransmission protocol operates between the AM RLC entities in the receiver and transmitter. By monitoring the incoming sequence numbers, the receiving RLC can identify missing PDUs.

When the AM RLC is configured to request retransmissions of missing PDUs as described above, it is said to be operating in Acknowledged Mode (AM). The AM RLC is typically used for TCP-based services such as file transfer where error-free data delivery is of primary interest.

The transmitting side of an AM RLC entity can receive a negative acknowledgement (notification of reception failure by its peer AM RLC entity) for an AMD PDU or a portion of an AMD PDU by a RLC status PDU from it peer AM RLC entity.

When receiving a negative acknowledgement for an AMD PDU or a portion of an AMD PDU by the RLC status PDU from its peer AM RLC entity, the transmitting side of the AM RLC entity may consider the AMD PDU or the portion of the AMD PDU for which a negative acknowledgement was received for retransmission if a Sequence Number (SN) of the corresponding AMD PDU falls within the range $VT(A) \leq SN < VT(S)$.

Herein, the 'VT(A)' indicates an acknowledgement state variable, this state variable holds the value of the SN of the next AMD PDU for which a positive acknowledgment is to be received in-sequence, and it serves as the lower edge of the transmitting window. It is initially set to 0, and is updated whenever the AM RLC entity receives a positive acknowledgment for an AMD PDU with SN=VT(A). And the 'VT(S)' indicates a send state variable, this state variable holds the value of the SN to be assigned for the next newly generated AMD PDU. It is initially set to 0, and is updated whenever the AM RLC entity delivers an AMD PDU with SN=VT(S).

When an AMD PDU or a portion of an AMD PDU is considered for retransmission, the transmitting side of the AM RLC entity may set the RETX_COUNT associated with the AMD PDU to zero if the AMD PDU is considered for retransmission for the first time. And the transmitting side of the AM RLC entity may increment the RETX_COUNT if it (the AMD PDU or the portion of the AMD PDU that is considered for retransmission) is not pending for retransmission already, or a portion of it is not pending for retransmission already. And the transmitting side of the AM RLC entity may indicate to upper layers that max retransmission has been reached if RETX_COUNT=maxRetxThreshold.

Herein, the 'RETX_COUNT' is a counter counting the number of retransmissions of an AMD PDU. There is one RETX_COUNT counter per PDU that needs to be retransmitted. And the 'maxRetxThreshold' is configured maximum number of re-transmission.

When retransmitting an AMD PDU, the transmitting side of an AM RLC entity may segment the AMD PDU, form a new AMD PDU segment which will fit within the total size of RLC PDU(s) indicated by lower layer at the particular transmission opportunity and deliver the new AMD PDU segment to lower layer if the AMD PDU doesn't entirely fit within the total size of RLC PDU(s) indicated by lower layer at the particular transmission opportunity.

When retransmitting a portion of an AMD PDU, the transmitting side of an AM RLC entity may segment the portion of the AMD PDU as necessary, form a new AMD PDU segment which will fit within the total size of RLC PDU(s) indicated by lower layer at the particular transmission opportunity and deliver the new AMD PDU segment to lower layer.

Regarding FIG. 11, RLC status PDUs are reported as feeding back to the transmitting RLC, requesting retransmission of missing PDUs. When to feedback a status report is configurable, but a report typically contains information about multiple PDUs and is transmitted relatively infrequently. Based on the received status report, the RLC entity at the transmitter can take the appropriate action and retransmit the missing PDUs if requested. Regarding FIG. 11, at time t=t1, PDUs up to n+5 have been transmitted. Only PDU n+5 has arrived and PDUs n+3 and n+4 are missing. This can cause a reordering timer to start. However, in this example no PDUs arrive prior to the expiration of the timer. The expiration of the timer, at time t=t2, triggers the receiver to send a control PDU containing a status report, indicating the missing PDUs, to its peer entity. Control PDUs have higher priority than data PDUs to avoid the status reports being unnecessarily delayed and negatively impact the retransmission delay. Upon reception of the status report at time t=t3, the transmitter knows that PDUs up to n+2 have been received correctly and the transmission window is advanced. The missing PDUs n+3 and n+4 are retransmitted and, this time, correctly received. The retransmission was triggered by the reception of a status report in this example. However, as the hybrid-ARQ and RLC protocols are located in the same node, tight interaction between the two is possible. The hybrid-ARQ protocol at the transmitting end could therefore inform the RLC at the transmitting end in case the transport block(s) containing PDUs n+3 and n+4 have failed. The RLC can use this to trigger retransmission of missing PDUs without waiting for an explicit RLC status report, thereby reducing the delays associated with RLC retransmissions.

Finally, at time t=t4, all PDUs, including the retransmissions, have been delivered by the transmitter and successfully received. As n+5 was the last PDU in the transmission buffer, the transmitter requests a status report from the receiver by setting a flag in the header of the last RLC data PDU. Upon reception of the PDU with the flag set, the receiver will respond by transmitting the requested status report, acknowledging all PDUs up to and including n+5. Reception of the status report by the transmitter causes all the PDUs to be declared as correctly received and the transmission window is advanced.

Status reports can, as mentioned earlier, be triggered for multiple reasons. However, to control the amount of status reports and to avoid flooding the return link with an excessive number of status reports, it is possible to use a status prohibit timer. With such a timer, status reports cannot be transmitted more often than once per time interval as determined by the timer.

For the initial transmission, it is relatively straightforward to rely on a dynamic PDU size as a means to handle the varying data rates. However, the channel conditions and the amount of resources may also change between RLC retransmissions. To handle these variations, already transmitted PDUs can be (re)segmented for retransmissions. The reordering and retransmission mechanisms described above still apply; a PDU is assumed to be received when all the segments have been received. Status reports and retransmissions operate on individual segments; only the missing segment of a PDU needs to be retransmitted.

In the prior art, the RLC transmitter retransmits an RLC PDU when the Negative Acknowledgement (NACK) is received from the peer RLC receiver via RLC status report. The RLC transmitter shall not retransmit an RLC PDU unless NACK is received from the peer RLC receiver. It means that the RLC transmitter has to wait at least one Round Trip Time (i.e. RLC PDU transmission→RLC status report) before performing RLC retransmission, which may not be suitable for low latency application.

Figure 12:
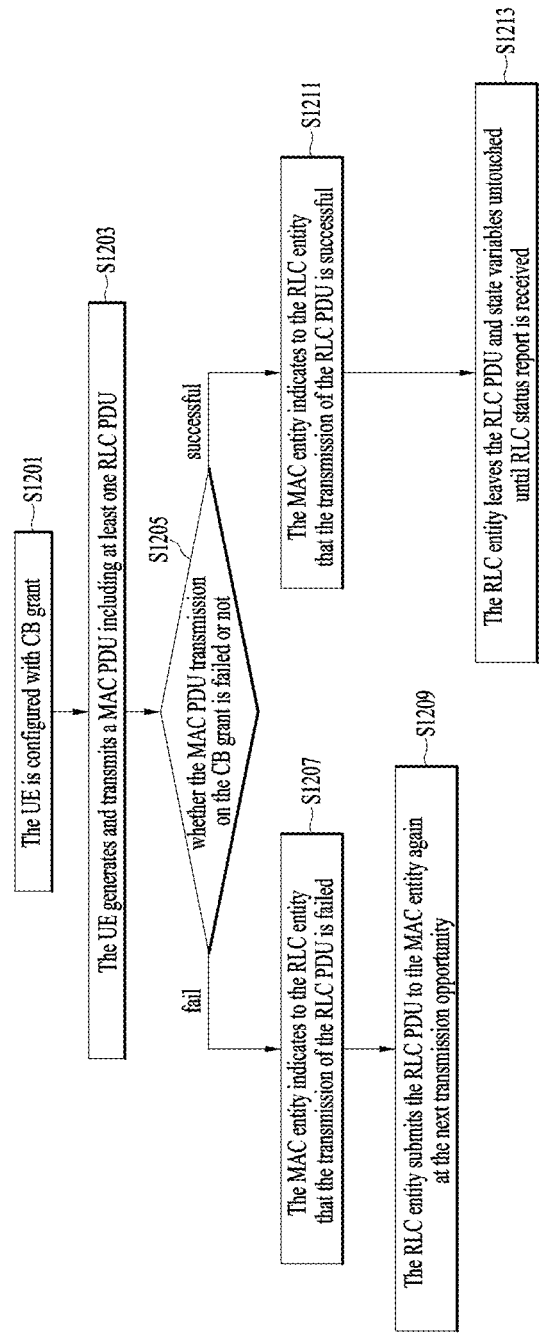
FIG. 12 is a conceptual diagram for performing RLC retransmission based on contention-based PUSCH in a wireless communication system according to embodiments of the present invention.

FIG. 12 is a conceptual diagram for performing RLC retransmission based on contention-based PUSCH in a wireless communication system according to embodiments of the present invention.

The UE is configured with CB grant in one or more subframes (S1201). The CB grant means a grant configured to the UE with an opportunity to send UL packets without requiring the UE to send a scheduling request. The CB grant is a time-frequency resource on which at least two UEs are allowed to transmit a MAC PDU to the eNB. That is, the CB grant is resource shared with two or more UEs.

Preferably, the CB grant is used only for synchronized UEs in order to transmit uplink data without sending Scheduling Request in advance.

Preferably, the CB grant correspond to uplink resources only that have not been reserved for dedicated uplink transmission (i.e, the dedicated uplink transmission is performed using conventional uplink grant) so that transmissions based on the CB grant do not interfere with dedicated uplink transmission.

The UE generates a MAC PDU including an UE identifier, e.g. C-RNTI, and at least one RLC PDU, and transmits the MAC PDU on CB grant (S1203).

A RLC PDU or a portion of an RLC PDU can be included in the MAC PDU.

The UE decides whether the MAC PDU transmission using the CB grant is failed or not (S1205).

Preferably, the UE decides the MAC PDU transmission using the CB grant is failed when i) the UE receives NACK indication of the CB-PUSCH transmission, ii) the UE does not receive ACK indication of the CB-PUSCH transmission until the CB-timer expires, or iii) the UE does not receive ACK indication of the CB-PUSCH transmission in any of the subframes mapped to the subframe where the CB-PUSCH transmission is performed.

If the UE decides that the MAC PDU transmission using the CB grant is failed, for each RLC PDU included in the MAC PDU, the MAC entity indicates to the RLC entity that the transmission of the RLC PDU is failed (S1207).

When the RLC entity receives an indication from the MAC entity that the transmission of a RLC PDU using the CB grant is failed, the RLC entity considers that NACK is received for the RLC PDU similar to the reception of RLC status report with NACK and prepares the RLC PDU for retransmission (S1209). That is, the RLC entity submits the RLC PDU to the MAC entity again at the next transmission opportunity.

However, when the RLC entity receives an indication from the MAC entity that the transmission of a RLC PDU using the CB grant is successful, the RLC entity does not consider ACK is received for the RLC PDU.

If the UE decides that the MAC PDU transmission using the CB grant is successful, for each RLC PDU included in the MAC PDU, the MAC entity indicates to the RLC entity that the transmission of the RLC PDU is successful (S1211). The RLC entity leaves the RLC PDU and state variables untouched. That is, the RLC entity keeps considering the RLC PDU unacknowledged and does not update state variables (S1213). In this case, only when the RLC status report including NACK for the at least one RLC PDU is received, the RLC entity of the UE retransmits the at least one RLC PDU at a next transmission opportunity to the MAC entity. That is, the RLC entity considers the RLC PDU acknowledged and updates state variables (e.g. update transmission window) only when the RLC status report including ACK for the RLC PDU is received from the peer RLC entity.

Figure 13:
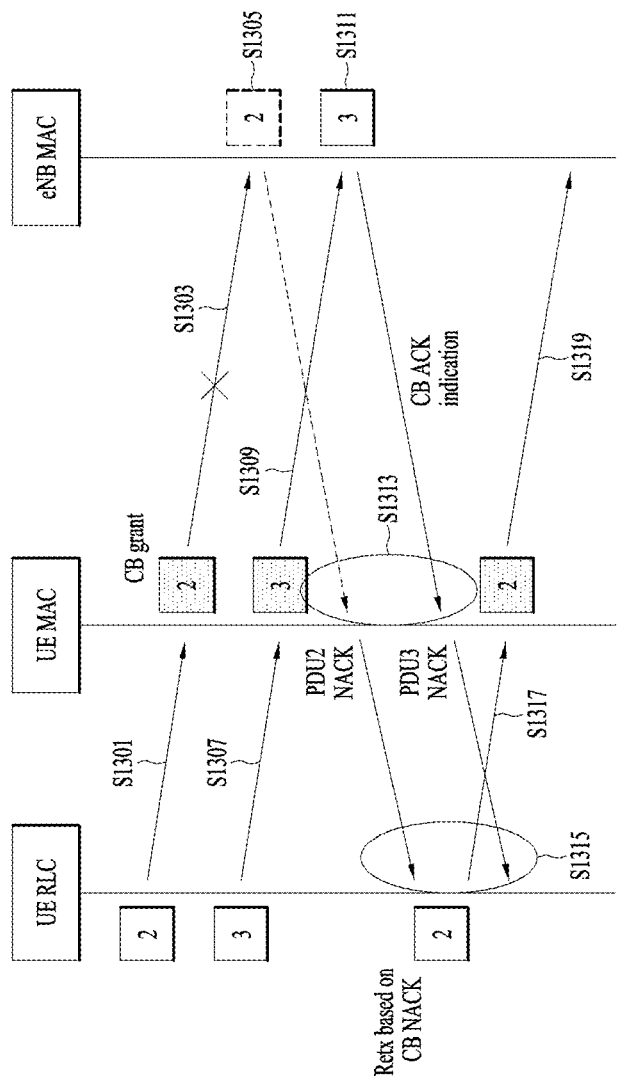
FIG. 13 is an example for performing RLC retransmission based on contention-based PUSCH in a wireless communication system according to embodiments of the present invention.

FIG. 13 is an example for performing RLC retransmission based on contention-based PUSCH in a wireless communication system according to embodiments of the present invention.

The eNB configures CB grant for a group of UEs. CB grant is configured in at least one subframes with a fixed size. The UE RLC entity generates RLC PDU2 and submits it to the UE MAC entity (S1301).

The UE MAC entity generates a MAC PDU including RLC PDU2, and transmits the MAC PDU to the eNB using CB grant (S1303). But the transmission of the MAC PDU is failed (S1305).

The UE RLC entity generates RLC PDU3 and submits it to the UE MAC entity (S1307). The UE MAC entity generates a MAC PDU including RLC PDU3, and transmits the MAC PDU to the eNB using CB grant (S1309). The transmission of the MAC PDU is successful (S1311).

When the eNB receives a MAC PDU, the eNB sends CB ACK indication to the UE. If the eNB does not receive a MAC PDU using the CB grant, there is no CB NACK indication because the eNB does not know whether there is CB transmission at all (S1313).

By using a timer, the UE MAC entity detects that the transmission of the MAC PDU including the RLC PDU2 has been failed. The UE MAC entity indicates to the UE RLC entity that the transmission of RLC PDU2 on CB grant has been failed (S1315).

When the UE RLC entity receives an indication from the UE MAC entity that the transmission of RLC PDU2 on CB grant has been failed, the UE RLC entity prepares the RLC PDU2 for retransmission. The UE RLC entity submits the RLC PDU2 to the UE MAC entity again (S1317).

The UE MAC entity generates a MAC PDU including RLC PDU2, and transmits the MAC PDU to the eNB using CB grant (S1319).

When the UE MAC entity receives a CB ACK indication from the eNB, the UE MAC entity decides that the transmission of the MAC PDU including the RLC PDU3 is successful, and indicates to the UE RLC entity that the transmission of RLC PDU3 on CB grant is successful. When the UE RLC entity receives an indication from the UE MAC entity that the transmission of RLC PDU3 on CB grant is successful, the UE RLC entity does nothing. The UE RLC entity just waits for RLC status report from the peer RLC entity.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a User Equipment (UE) operating in a wireless communication system, the method comprising:
   transmitting, by a Medium Access Control (MAC) entity of the UE, a MAC Protocol Data Unit (PDU) including at least one Radio Link Control (RLC) PDU received from a RLC entity and an identifier of the UE using a Contention-Based (CB) grant to an e-NodeB (eNB);
   determining, by the MAC entity of the UE, whether the MAC PDU transmission using the CB grant is failed or not;
   indicating, by the MAC entity of the UE, that transmission of each RLC PDU in the MAC PDU using the CB grant is failed or successful according to the determining to a corresponding RLC entity of the UE which transmits the each RLC PDU;
   waiting, by the RLC entity of the UE, for reception of a RLC status report including ACK for a corresponding RLC PDU from the eNB when the RLC entity of the UE receives the indication that transmission of the corresponding RLC PDU in the MAC PDU using the CB grant is successful from the MAC entity of the UE.

2. The method according to claim 1, wherein the MAC entity of the UE decides the MAC PDU transmission using the CB grant is failed, when the UE receives NACK indication of the MAC PDU transmission, or the UE does not receive an ACK indication of the MAC PDU transmission until a timer expires, or the UE does not receive the ACK indication of the MAC PDU transmission in any of subframes mapped to a subframe where the MAC PDU transmission is performed.

3. The method according to claim 1, wherein when a RLC entity of the UE receives the indicating that transmission of corresponding RLC PDU in the MAC PDU using the CB grant is fail from the MAC entity of the UE, the RLC entity of the UE considers reception of a RLC status report including NACK for the corresponding RLC PDU from the eNB.

4. The method according to claim 1, wherein the CB grant is a time/frequency resource on which at least two UEs are allowed to transmit a MAC PDU to the eNB.

5. A User Equipment (UE) operating in a wireless communication system, the UE comprising:
   a transceiver; and
   a processor configured to:
   control the transceiver,
   transmit a Medium Access Control (MAC) Protocol Data Unit (PDU) including at least one Radio Link Control (RLC) PDU received from a RLC entity and an identifier of the UE using a Contention-Based (CB) grant to an e-NodeB (eNB);
   determine whether the MAC PDU transmission using the CB grant is failed or not;
   indicate that transmission of each RLC PDU in the MAC PDU using the CB grant is failed or successful according to the determining to a higher layer;
   wait for reception of a RLC status report including ACK for the at least one RLC PDU when the RLC entity of the UE receives the indication that transmission of a corresponding RLC PDU in the MAC PDU using the CB grant is successful.

6. The UE according to claim 5, wherein the UE decides the MAC PDU transmission using the CB grant is failed, when the UE receives NACK indication of the MAC PDU transmission, or the UE does not receive an ACK indication of the MAC PDU transmission until a timer expires, or the UE does not receive the ACK indication of the MAC PDU transmission in any of subframes mapped to a subframe where the MAC PDU transmission is performed.

7. The UE according to claim 5, wherein when a RLC entity of the UE receives the indicating that transmission of corresponding RLC PDU in the MAC PDU using the CB grant is fail from the MAC entity of the UE, the RLC entity of the UE considers reception of a RLC status report including NACK for the corresponding RLC PDU from the eNB.

8. The UE according to claim 5, wherein the CB grant is a time/frequency resource on which at least one UE is allowed to transmit a MAC PDU to the eNB.

* * * * *